US012644068B2

(12) United States Patent     (10) Patent No.:   US 12,644,068 B2

Ishizuka     (45) Date of Patent:   *\*Jun. 2, 2026*

(54) METHOD OF MANUFACTURING NON-AQUEOUS SECONDARY BATTERY

(71) Applicant: TOYOTA JIDOSHA KABUSHIKI KAISHA, Toyota (JP)

(72) Inventor: Masahiro Ishizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

This patent is subject to a terminal disclaimer.

(21) Appl. No.: 18/410,327

(22) Filed: Jan. 11, 2024

(65) Prior Publication Data

US 2024/0141251 A1    May 2, 2024

Related U.S. Application Data

(63) Continuation of application No. 16/544,236, filed on Aug. 19, 2019, now Pat. No. 11,905,487.

(30) Foreign Application Priority Data

Aug. 29, 2018    (JP) ................................. 2018-160068

(51) Int. Cl.
    *H01M 10/04*     (2006.01)
    *B23K 26/20*     (2014.01)
    *C10M 169/00*     (2006.01)
    *H01M 10/05*     (2010.01)
    (Continued)

(52) U.S. Cl.
    CPC ......... *C10M 169/00* (2013.01); *B23K 26/206* (2013.01); *H01M 10/04* (2013.01); (Continued)

(58) Field of Classification Search
    CPC .. H01M 50/15; H01M 50/103; H01M 50/119; H01M 50/159; H01M 50/169; (Continued)

(56) References Cited

U.S. PATENT DOCUMENTS 5,580,675 A    12/1996   Rouhani
2003/0003365 A1    1/2003   Sagawa et al.
(Continued)

FOREIGN PATENT DOCUMENTS

JP     10-289697 A    10/1998
JP     2004-259626 A    9/2004
(Continued)

OTHER PUBLICATIONS

Umeyama, Hiroya, JP-2015125883-A Abstract Translation (Year: 2015).
(Continued)

*Primary Examiner* — Osei K Amponsah
(74) *Attorney, Agent, or Firm* — Sughrue Mion, PLLC

(57) ABSTRACT

A method of manufacturing a non-aqueous secondary battery includes the steps of preparing a case main body, preparing a lid, applying a lubricant to a contact location, and assembling a lid to an open end of the case main body. In the step of preparing a lid, a lid to be fitted to the open end of the case main body is prepared. In the step of applying a lubricant, the lubricant is applied to at least a portion of the contact location at which the case main body and the lid are in contact with each other. In the step of assembling the lid to the open end, the lid is assembled to the open end with the lubricant having been applied to the contact location. The lubricant may be a solvent used in a non-aqueous electrolyte solution for non-aqueous secondary batteries.

20 Claims, 4 Drawing Sheets

(51) Int. Cl.
  *H01M 10/0566* (2010.01)
  *H01M 50/103* (2021.01)
  *H01M 50/15* (2021.01)
  *H01M 50/119* (2021.01)
  *H01M 50/159* (2021.01)
  *H01M 50/169* (2021.01)
(52) U.S. Cl.
  CPC ....... *H01M 10/05* (2013.01); *H01M 10/0566*
    (2013.01); *H01M 50/103* (2021.01); *H01M*
    *50/15* (2021.01); *H01M 50/119* (2021.01);
    *H01M 50/159* (2021.01); *H01M 50/169*
    (2021.01)
(58) Field of Classification Search
  CPC ... H01M 10/04; H01M 10/05; H01M 10/0566
  See application file for complete search history.

(56) References Cited

U.S. PATENT DOCUMENTS

| | | | |
|---|---|---|---|
| 2012/0219825 A1 | 8/2012 | Minagi et al. | |
| 2015/0044525 A1* | 2/2015 | Jourdren | H01G 9/145 |
| | | | 29/623.1 |

| | | | |
|---|---|---|---|
| 2015/0064529 A1* | 3/2015 | Nagai | H01M 10/0587 |
| | | | 429/94 |
| 2015/0086820 A1* | 3/2015 | Lee | H01M 50/105 |
| | | | 429/162 |
| 2015/0360320 A1 | 12/2015 | Yoshida et al. | |

FOREIGN PATENT DOCUMENTS

| | | | |
|---|---|---|---|
| JP | 2012-109130 A | 6/2012 | |
| JP | 2015-060831 A | 3/2015 | |
| JP | 2015-125883 A | 7/2015 | |
| JP | 2016-002562 A | 1/2016 | |

OTHER PUBLICATIONS

Umeyama, Hiroya, JP-2015125883-A Specification Translation (Year: 2015).
Ikumi, Motoi, JP-2012109130-A Specification Translation (Year: 2012).

* cited by examiner 41b    41    41b2    41c

41b1

METHOD OF MANUFACTURING NON-AQUEOUS SECONDARY BATTERY

CROSS REFERENCE TO RELATED APPLICATIONS

The present application is a continuation of U.S. application Ser. No. 16/544,236 filed Aug. 19, 2019, which claims priority from Japanese Patent Application No. 2018-160068 filed on Aug. 29, 2018, both of which are incorporated herein by reference in their respective entireties.

BACKGROUND

The present disclosure relates to a method of manufacturing a non-aqueous secondary battery.

JP 2015-060831 A discloses a non-aqueous electrolyte secondary battery. The publication discloses that an electrode assembly is enclosed inside a case main body through an open end of the case main body, a lid is fitted to the open end, and the fitted portion between the lid and the case main body is laser welded all around.

JP 2016-2562 A discloses preparing what is called a prismatic case main body in a flat rectangular parallelepiped shape and a plate-shaped lid to be fitted to an open end of the case main body, the open end being one side end of the case main body that is open, fitting the lid to the open end of the case main body, and laser-welding the lid and the open end of the case main body all around along the peripheral edge of the open end.

SUMMARY

A non-aqueous secondary battery is typically furnished with a lid and a case main body provided with an open end. The lid and the open end of the case main body are laser welded together all around so that the open end of the case main body is hermetically sealed. Although assembling of the lid and the case main body requires high precision in shapes and dimensions of parts, it is possible that an overlapping portion may form between the lid and the open end of the case main body due to the tolerance in dimensions of the parts. This means that the lid and the case main body may rub against each other when fitting the lid to the open end of the case main body.

A method of manufacturing a non-aqueous secondary battery disclosed herein includes the steps of preparing a case main body, preparing a lid, applying a lubricant to contact locations, and assembling a lid to an open end of the case main body.

In the step of preparing a case main body, the case main body is prepared. The case main body prepared in this step includes an enclosing space for enclosing an electrode assembly and an open end for inserting the electrode assembly into the enclosing space.

In the step of preparing a lid, the lid to be fitted to the open end of the case main body is prepared.

In the step of applying a lubricant, the lubricant is applied to at least a portion of the contact locations at which the case main body and the lid are in contact with each other.

In the step of assembling a lid to an open end, the lid is assembled to the open end with the lubricant having been applied to the contact locations. The lubricant may be a solvent used in a non-aqueous electrolyte solution for non-aqueous secondary batteries.

The just-described method of manufacturing a non-aqueous secondary battery reduces the friction that is produced when assembling the lid to the open end and accordingly reduces the formation of contaminants.

Here, in the step of applying a lubricant, the lubricant may be applied to at least one of the case main body and the lid.

In addition, the open end of the case main body may include a plurality of linear portions and a plurality of curved portions arranged along an edge of the open end, and each of the contact locations may include a plurality of linear portions and a plurality of curved portions arranged along the edge of the open end. In this case, it is possible that in the step of applying a lubricant, the lubricant may be applied to at least the plurality of curved portions of the contact locations.

It is also possible that the open end of the case main body may be in a substantially rectangular shape and may include a step along an inner side wall of the case main body. In this case, the lid may be a substantially rectangular-shaped plate material fitted to the open end. It is possible that in the step of applying a lubricant, the lubricant may be applied to at least one of corner portions of the substantially rectangular-shaped open end and corner portions of the lid.

In addition, the lubricant may be at least one solvent selected from the group consisting of cyclic carbonate solvents, chain carbonate solvents, and ether solvents.

For example, the lubricant may be at least one solvent selected from the group consisting of ethyl methyl carbonate, ethylene carbonate, dimethyl ether, diethyl carbonate, propylene carbonate, and dimethyl carbonate.

DETAILED DESCRIPTION

Hereinbelow, embodiments of a method of manufacturing a non-aqueous secondary battery according to the present disclosure will be described in detail. It should be noted, however, that the embodiments described herein are, of course, not intended to limit the present invention. The present invention is not limited to the embodiments described herein unless specifically stated otherwise.

Figure 1:
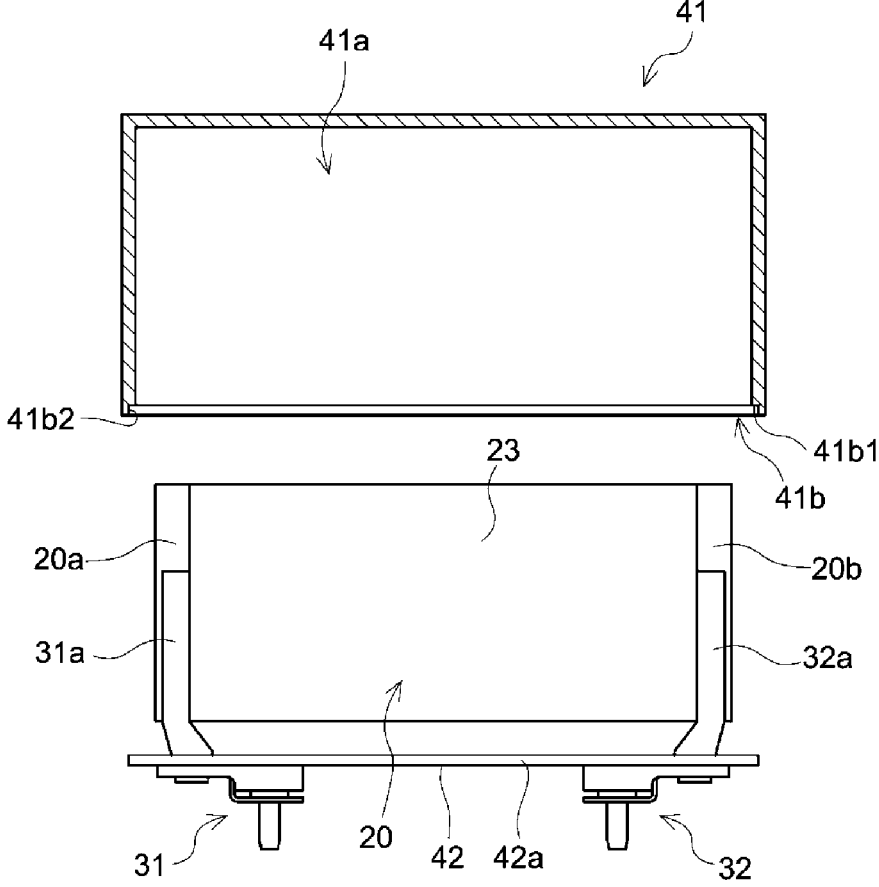
FIG. 1 is a schematic view for schematically illustrating process steps of a method of manufacturing a non-aqueous secondary battery.
Figure 2:
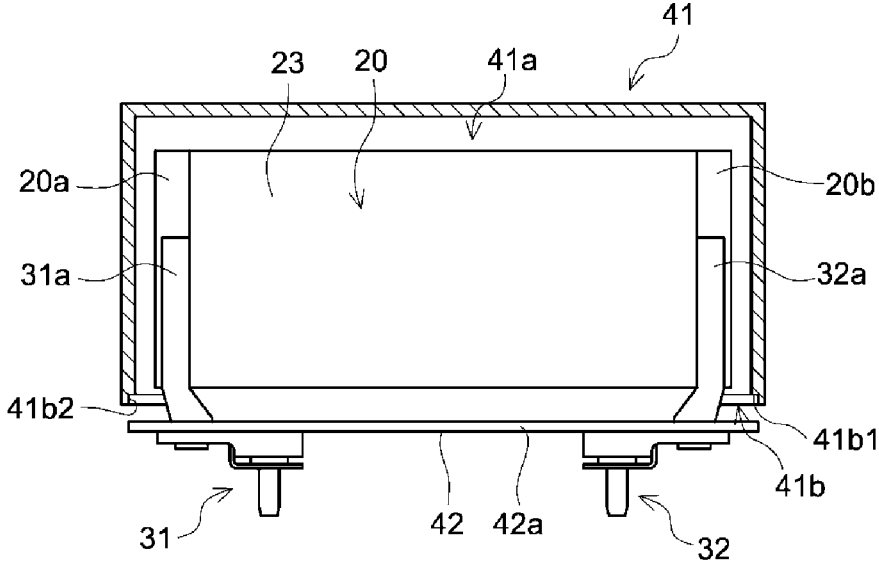
FIG. 2 is a schematic view for schematically illustrating process steps of the method of manufacturing a non-aqueous secondary battery.

FIGS. 1 and 2 are schematic views for schematically illustrate the manufacturing steps of the method of manufacturing a non-aqueous secondary battery disclosed herein.

The method of manufacturing a non-aqueous secondary battery disclosed herein includes the steps of preparing a case main body 41 (see FIGS. 1 and 2), preparing a lid 42 (see FIGS. 1 and 2), applying a lubricant (not shown), and assembling the lid 42 to an open end 41b.

In the step of preparing the case main body 41, the case main body 41 is prepared. As illustrated in FIGS. 1 and 2, the case main body 41 prepared in this step may include an enclosing space 41a for enclosing an electrode assembly 20 and an open end 41b for inserting the electrode assembly 20 into the enclosing space 41a. In the step of preparing the lid 42, the lid 42 to be fitted to the open end 41b is prepared.

The shape of the case main body 41 and the shape of the lid 42 are not limited to a particular shape unless specifically stated otherwise. In the embodiment shown in FIGS. 1 and 2, the case main body 41 may be what is called a prismatic aluminum case, for example, in a flat substantially rectangular parallelepiped shape. The case main body 41 has the enclosing space 41*a* that can enclose the electrode assembly 20 that is formed in a flat shape.

Figure 3:
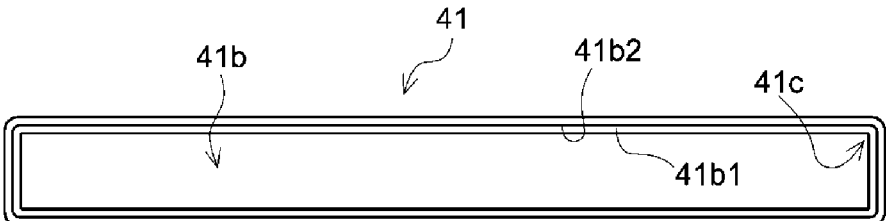
FIG. 3 is a plan view illustrating an open end 41b of a case main body 41.
Figure 4:
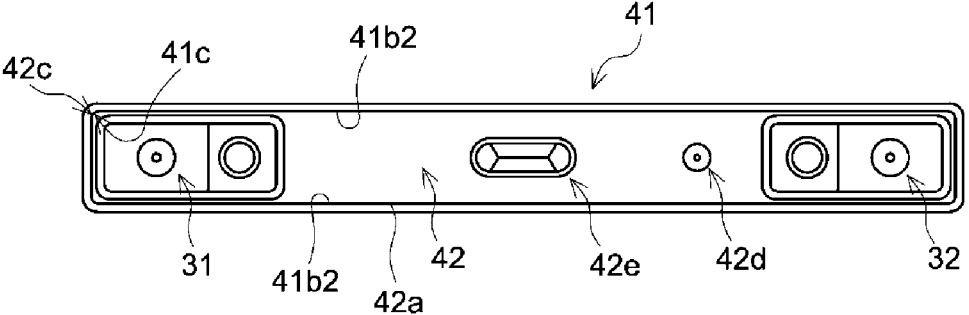
FIG. 4 is a plan view illustrating the open end 41b of the case main body 41 to which a lid 42 is fitted.

One of the flat surfaces of the case main body 41 is open. In this embodiment, an open end is formed in one side face of the case main body 41 that is perpendicular to one of the longer sides of a wide rectangular face with the widest area among its rectangular faces. This open end serves as the open end 41*b* for enclosing the electrode assembly 20 into the enclosing space 41*a*. FIG. 3 is a plan view illustrating an open end 41*b* of a case main body 41. In this embodiment, a stepped portion 41*b*1 is provided at an inner side face edge of the open end 41*b* of the case main body 41. The lid 42 (see FIGS. 1 and 2) is fitted to the stepped portion 41*b*1. FIG. 4 is a plan view illustrating the open end 41*b* of the case main body 41 to which a lid 42 is fitted. This embodiment shows that the stepped portion 41*b*1 is provided at the entire perimeter of the open end 41*b* of the case main body 41, but this is merely an example. The stepped portion 41*b*1 may not be provided throughout the entire perimeter of the open end 41*b* of the case main body 41. The stepped portion 41*b*1 may be provided in a portion of the perimeter of the open end 41*b* of the case main body 41. For example, it is possible that the stepped portion 41*b*1 may be provided only along the shorter sides of the open end 41*b* of the case main body 41.

The electrode assembly 20 is what is called a battery element. The specific embodiment of the electrode assembly 20 is not limited to the embodiments illustrated herein, unless specifically stated otherwise. Although not shown in detail in the drawings, the electrode assembly 20 illustrated herein may be what is called a stacked electrode assembly, in which positive electrode sheets and negative electrode sheets are alternately stacked with separator sheets interposed therebetween. In another embodiment of the electrode assembly 20, it is possible that the electrode assembly may include a positive electrode sheet, a first separator sheet, a negative electrode sheet, and a second separator sheet, each of which may be a long strip-shaped member. The electrode assembly 20 may be what is called a wound electrode assembly in which the positive electrode sheet and the negative electrode sheet, each being a long strip-shaped member, are alternately stacked and wound with the first separator sheet and the second separator sheet interposed therebetween.

The positive electrode sheet may include a positive electrode current collector foil (for example, an aluminum foil), a positive electrode active material layer containing a positive electrode active material, and an uncoated portion defined with a constant width along one lateral edge of the positive electrode current collector foil. The positive electrode active material layer may be formed on both faces of the positive electrode current collector foil, except for the uncoated portion. The uncoated portion of the positive electrode current collector foil, on which the positive electrode active material layer is not formed, may serve as a positive-electrode current collecting portion 20*a* of the electrode assembly 20. In a lithium-ion secondary battery, the positive electrode active material is a material that releases lithium ions during charge and absorbs lithium ions during discharge, such as lithium-transition metal composite material. Generally, other than the lithium-transition metal composite material, various materials have been proposed for use as the positive electrode active material, and the positive electrode active material is not limited to a particular material.

The negative electrode sheet may include a negative electrode current collector foil (for example, a copper foil), a negative electrode active material layer containing a negative electrode active material, and an uncoated portion defined with a constant width along one lateral edge of the negative electrode current collector foil. The negative electrode active material layer is formed on both faces of the negative electrode current collector foil, except for the uncoated portion. The uncoated portion of the negative electrode current collector foil, on which the negative electrode active material layer is not formed, may serve as a negative-electrode current collecting portion 20*b* of the electrode assembly 20. In a lithium-ion secondary battery, for example, the negative electrode active material is a material that absorbs lithium ions during charge and releases the absorbed lithium ions during discharge, such as graphite. Generally, other than graphite, various materials have been proposed for use as the negative electrode active material, and the negative electrode active material is not limited to a particular material.

The separator sheet may be formed of, for example, an electrolyte-permeable porous resin sheet that achieves desired heat resistance. Various proposals have been made about the separator sheet, and there is no particular restriction on the separator sheet. It may be possible that the negative electrode active material layer of the negative electrode sheet cover the positive electrode active material layer of the positive electrode sheet with the separator sheet interposed between the negative electrode active material layer and the positive electrode active material layer. It may also be possible that the separator sheet cover the positive electrode active material layer of the positive electrode sheet and the negative electrode active material layer of the negative electrode sheet.

In the embodiment shown in FIGS. 1 and 2, the electrode assembly 20 is a wound electrode assembly, which is in a substantially rectangular flat shape such that it can be enclosed in the enclosing space 41*a* of the case main body 41. In this case, the uncoated portion serving as the positive-electrode current collecting portion 20*a* and the uncoated portion as the negative-electrode current collecting portion 20*b* are oriented so as to protrude laterally in opposite directions (i.e., along the longer sides). The uncoated portion serving as the positive-electrode current collecting portion 20*a* protrudes from one of the lateral edges of the separator sheet 23. The uncoated portion serving as the negative-electrode current collecting portion 20*b* protrudes from the other one of the lateral edges of the separator sheet 23.

The lid 42 is fitted to the open end 41*b* of the case main body 41. In this embodiment, the stepped portion 41*b*1 is provided at the edge of the open end 41*b* of the case main body 41 that faces inward. The lid 42 is a plate-shaped member that can be fitted with the stepped portion 41*b*1. In addition, in the embodiment, a positive electrode terminal 31 and a negative electrode terminal 32 are attached to the lid 42. The positive electrode terminal 31 and the negative electrode terminal 32 are provided with current collector pieces 31*a* and 32*a*, respectively, such as to extend into the case main body 41. The positive-electrode current collecting portion 20*a* of the electrode assembly 20 is attached to the current collector piece 31*a* of the positive electrode terminal 31 by, for example, welding. The negative-electrode current collecting portion 20*b* of the electrode assembly 20 is attached to the current collector piece 32*a* of the negative electrode terminal 32. As illustrated in FIG. 4, the lid 42 is provided with a filling port 42*d* and a safety vent 42*e*. When assembling the lid 42 to the case main body 41, the filling port 42*d* is open. The lid 42 is assembled to the case main body 41, then the lid 42 is welded to the case main body 41, and an electrolyte solution is filled into the case main body 41. Thereafter, the filling port 42*d* is sealed.

In this embodiment, as illustrated in FIGS. 1 and 2, the lid 42 is fitted to the case main body 41 while the electrode assembly 20 is placed into the case main body 41 with the electrode assembly 20 attached to the lid 42. At this time, as illustrated in FIG. 1, for example, the electrode assembly 20 attached to the lid 42 is oriented upward, and the open end 41*b* of the case main body 41 is oriented downward and arranged above the electrode assembly 20. Subsequently, as illustrated in FIG. 2, the lid 42 is moved upward relative to the case main body 41, so that the electrode assembly 20 is placed into the case main body 41 through the open end 41*b*. Then, the electrode assembly 20 is enclosed in the enclosing space 41*a*, and the lid 42 is fitted to the stepped portion 41*b*1 of the open end 41*b*. It should be noted that the orientation of the electrode assembly 20 when enclosed in the enclosing space 41*a*, for example, is not limited to the example shown in the drawings. Moreover, in the process as described above, the case main body 41 and the lid 42 may be supported by appropriate tools, for example, and appropriate position alignment may be carried out with, for example, robot arms of an automatic assembly robot when fitting the case main body 41 and the lid 42 to each other. Thus, because the lid 42 is fitted to the open end 41*b* of the case main body 41 from below in this way, contaminants, if produced during fitting of the lid 42, are unlikely to enter the inside of the case main body 41.

The lid 42 is formed of the same type of aluminum material as the case main body 41. The lid 42 is fitted into the stepped portion 41*b*1 of the case main body 41 and welded thereto by laser welding. In this case, the lid 42 and the case main body 41 are welded to each other so that no gap exists therebetween. The shape of the stepped portion 41*b*1 of the case main body 41 and the shape of the lid 42 are formed so as to have a narrow gap therebetween so that the gap between the lid 42 and the case main body 41 can be closed by laser welding. Even so, the case main body 41 and the lid 42 may rub against each other within the range of dimensional tolerance, when fitting the lid 42 to the case main body 41.

For example, a peripheral edge portion 42*a* of the lid 42 may rub against an inner side wall 41*b*2 (see FIG. 3) of the open end 41*b* of the case main body 41. The open end 41*b* in such a substantially rectangular shape shows high rigidity in regions surrounding corner portions 41*c* of the open end 41*b*. Therefore, the side wall 41*b*2 of the open end 41*b* and the peripheral edge portion 42*a* of the lid 42 are prone to rubbing against each other at the corner portions 41*c* and in the regions surrounding the corner portions 41*c* of the open end 41*b*.

In the step of applying a lubricant, the lubricant (not shown) is applied to a contact location at which the case main body 41 and the lid 42 are in contact with each other when fitting the lid 42 to the open end 41*b* of the case main body 41.

The contact location may vary depending on the shapes of the case main body 41 and the lid 42. In the embodiment shown in FIGS. 1 and 2, the contact location includes the side wall 41*b*2 and the stepped portion 41*b*1 of the open end 41*b* of the case main body 41, and the peripheral edge portion 42*a* of the lid 42.

Herein, the lubricant may be a solvent that is commonly used in a non-aqueous electrolyte solution for non-aqueous secondary batteries. The solvent used in a non-aqueous electrolyte solution for non-aqueous secondary batteries may be an organic solvent that has a required voltage tolerance. The required voltage may be determined from the voltage that is produced in charging and discharging of the non-aqueous secondary battery. When the lubricant is a solvent used in a non-aqueous electrolyte solution for non-aqueous secondary batteries, it is unlikely to cause a problem even when the lubricant remains inside the battery case. It should be noted that the solvent used in a non-aqueous electrolyte solution for non-aqueous secondary batteries is not limited to the solvent used in the non-aqueous electrolyte solution of the non-aqueous secondary battery manufactured according to the present disclosure.

An example of the solvent used in a non-aqueous electrolyte solution for non-aqueous secondary batteries is a solvent containing at least one material selected from cyclic carbonate solvents, chain carbonate solvents, and ether solvents. Specifically, it is possible to use a solvent containing at least one material selected from ethyl methyl carbonate, ethylene carbonate, dimethyl ether, diethyl carbonate, propylene carbonate, and dimethyl carbonate. These examples of the materials specifically mentioned herein may be used either alone or in combination as appropriate. Because these materials show high volatility, these materials volatilize in later processing steps. Moreover, because these materials are used in a non-aqueous electrolyte solution for non-aqueous secondary batteries, there will be no particular adverse effect on the later processing steps even if the lubricant does not volatilize but remains in the battery case. Furthermore, the materials listed here have little adverse effects on the battery performance even if the material remains inside the cell after having been used as the lubricant as described above. Also, the materials listed here will not affect the welded portion even if the material adheres onto the welded portion.

Examples of materials that are unsuitable as the lubricant include materials such as press forming oil and grease. Such materials contain chlorine or sulfur, and may react with aluminum, which is used for the case main body 41 and the lid 42. Materials that can corrode the case main body 41 and the lid 42 and materials that do not volatilize easily are also unsuitable. Materials that do not vaporize easily are likely to remain inside the cell. In addition, materials that do not vaporize easily may cause adverse effects when welding the case main body 41 and the lid 42 together. Therefore, such materials are unsuitable for the lubricant.

In the step of assembling the lid 42 to the open end 41*b*, the lid 42 is assembled to the open end 41*b* with the lubricant having been applied to the contact location. At this time, because the lubricant is applied to the contact location between the open end 41*b* and the lid 42, friction therebetween is reduced when the lid 42 is fitted to the open end 41*b*. In this case, the locations at which the lid 42 and the open end 41*b* are fitted may overlap each other even within the tolerance in geometric dimensions, for example. This causes the lid 42 and the open end 41*b* to rub against each other. According to the manufacturing method disclosed herein, the lubricant is applied to the contact location between the open end 41*b* and the lid 42. Therefore, even if the lid 42 and the open end 41*b* rub against each other, they are unlikely to produce microscopic contaminants. In addition, the lubricant applied to the contact location where the lid 42 and the open end 41*b* are in contact with each other is forced out of the contact location when fitting the lid 42 to the open end 41*b*. As a result, even if contaminants are produced by the lid 42 and the open end 41*b* that have rubbed against each other, the contaminants are forced out of the contact location together with the lubricant when fitting the lid 42 to the open end 41*b*. For this reason, the contaminants that are produced when fitting the lid 42 to the open end 41*b* are unlikely to enter the enclosing space 41*a* of the case main body 41. Thus, the manufacturing method disclosed herein reduces the friction between the lid 42 and the open end 41*b* when assembling the lid 42 to the open end 41*b*, and accordingly reduces the formation of contaminants.

With the manufacturing method disclosed herein, microscopic contaminants do not easily form even when the lid and the open end rub against each other, and even when such contaminants form, they do not easily enter the enclosing space 41*a* of the case main body 41. For this reason, the manufacturing method disclosed herein is suitable when the case main body 41 and the lid 42 are made of a material that is prone to formation of contaminants when rubbed. The manufacturing method disclosed herein is suitable, for example, when aluminum or an aluminum alloy is for the case main body 41 and the lid 42.

Here, in the step of applying a lubricant, the lubricant may be applied to at least one of the case main body 41 and the lid 42. For example, in the embodiment described above, the contact location includes the side wall 41*b*2 and the stepped portion 41*b*1 of the open end 41*b* of the case main body 41, and the peripheral edge portion 42*a* of the lid 42. Accordingly, the lubricant may be applied to either one of the inner side wall 41*b*2 of the open end 41*b* of the case main body 41 or the peripheral edge portion 42*a* of the lid 42. Alternatively, the lubricant may be applied to both the inner side wall 41*b*2 of the open end 41*b* of the case main body 41 and the peripheral edge portion 42*a* of the lid 42.

In the above-described embodiment, the open end 41*b* of the case main body 41 is in a substantially rectangular shape, and includes the stepped portion 41*b*1 along the inner side wall 41*b*2 of the case main body 41. The lid 42 is a substantially rectangular-shaped plate material fitted to the open end 41*b*. Herein, the lid 42 is a plate material in a substantially rectangular shape that corresponds to the shape of the open end 41*b* of the case main body 41, and the lid 42 is shaped so as to substantially precisely fit to the open end 41*b* of the case main body 41. Furthermore, the lid 42 may in some cases be pressed lightly into the open end 41*b* when assembled to the open end 41*b*.

In that case, the regions surrounding the corner portions 41*c* of the substantially rectangular-shaped open end 41*b*, including the exact corner portions 41*c*, have particularly high rigidity. Accordingly, the regions surrounding the corner portions 41*c* are prone to rubbing with the regions surrounding corner portions 42*c* of the lid 42, including the exact corner portions 42*c*, when the lid 42 is assembled to the open end 41*b*. For this reason, in the step of applying a lubricant, the lubricant may be applied to at least one of the corner portions 41*c* of the substantially rectangular-shaped open end 41*b* and the corner portions 42*c* of the lid 42. Herein, the corner portions 41*c* of the open end 41*b* may include the regions surrounding the corner portions 41*c* of the open end 41*b* in a substantially rectangular shape. The corner portions 42*c* of the lid 42 may include regions surrounding the exact corner portions 42*c*. That is, the location to which the lubricant should be applied may be either one of the corner portions 41*c* of the open end 41*b* and the regions surrounding the corner portions 41*c*, and the corner portions 42*c* of the lid 42 and the regions surrounding the corner portions 42*c*. Alternatively, the location to which the lubricant should be applied may be both of the corner portions 41*c* of the open end 41*b* and the regions surrounding the corner portions 41*c* and the corner portions 42*c* of the lid 42 and the regions surrounding the corner portions 42*c*.

Herein, for example, the regions surrounding the corner portions 41*c* of the open end 41*b* and the regions surrounding the corner portions 42*c* of the lid 42 may be determined to extend at least 20 mm or greater along the longer sides from the respective shorter sides, and the regions surrounding the corner portions 41*c* and 42*c* may be determined to extend at least 1 mm or greater along the shorter sides from the respective longer sides.

Also, when the lubricant is applied to the lid 42, the lubricant may be applied to a height of 1 mm or higher from the end from which the lid 42 is inserted into the case main body 41.

The regions surrounding the corner portions 41*c* and 42*c* are not limited to the areas exemplified here. The regions surrounding the corner portions 41*c* and 42*c* may be set to the portions surrounding the corner portions 41*c* and 42*c* in which the lid 42 and the open end 41*b* of the case main body 41 are prone to rubbing against each other.

In addition, the lubricant may be applied to portions where the lid 42 and the open end 41*b* of the case main body 41 are prone to rub against each other, other than the surrounding regions of the corner portions 41*c* and 42*c*.

The application of the lubricant may be operated by a robot arm of an automatic assembly robot so that an appropriate amount of lubricant is applied to a predetermined appropriate position on the lid 42 or on the open end 41*b* of the case main body 41. When this is the case, it is possible that the lubricant may be enclosed, for example, in a cylinder and be supplied in an appropriate amount. Alternatively, the lubricant may be sprayed through nozzles, for example, in an appropriate amount. The application amount of the lubricant may be adjusted, depending on the type of the lubricant and the location to which the lubricant is to be applied, to such a level that the friction between the lid 42 and the open end 41*b* of the case main body 41 can be reduced and also the lubricant can be volatilized at appropriate timing so as not to remain on the battery case in the later processing steps. The application amount of the lubricant may be adjusted to such an amount that excessive lubricant can be forced out of the case main body 41 when the lid 42 is assembled to the open end 41*b*, from the viewpoint that the contaminants that are produced when the lid 42 is assembled to the open end 41*b* of the case main body 41 need to be ejected.

This embodiment illustrates an example in which each of the open end 41*b* and the lid 42 is in a flat rectangular shape. However, the shape of the lid 42 and the shape of the open end 41*b* of the case main body 41 are not limited to such a shape. For example, the lid 42 and the open end 41*b* of the case main body 41 may be in a circular shape or in an elliptic shape. When this is the case, it is possible that in the step of applying a lubricant, the lubricant may be applied to the entire circumference of the peripheral edge portion of the lid 42 and the open end 41*b* of the case main body 41. In addition, when it is possible to specify locations that are particularly prone to rubbing against each other in the peripheral edge portion of the lid 42 and the open end 41*b* of the case main body 41 because of the shape or the assembling method, the lubricant may be applied to the locations that are particularly prone to rubbing against each other in the peripheral edge portion of the lid 42 and the open end 41*b* of the case main body 41.

When the lid 42 and the open end 41*b* of the case main body 41 are, for example, in a substantially polygonal shape, the open end 41*b* of the case main body 41 includes a plurality of linear portions and a plurality of curved portions along the edge of the open end 41*b*. In this case, the contact location also includes a plurality of linear portions and a plurality of curved portions along the edge of the open end. When this is the case, it is possible that in the step of applying a lubricant, the lubricant may be applied to at least the plurality of curved portions of the contact location. Because the curved portions have higher rigidity than the linear portions, the curved portions are prone to rubbing against each other. When they rub against each other, scratches are likely to form. For this reason, the lubricant may be applied at least to the curved portions of the contact location.

Thus, the shape of the open end 41*b* of the case main body 41 and the shape of the lid 42 are not limited to a substantially rectangular shape, unless specifically stated otherwise. When the open end 41*b* of the case main body 41 and the lid 42 are in a substantially rectangular shape as described above, the corner portions 41*c* and 42*c* correspond to the curved portions. The longer sides and the shorter sides correspond to the linear portions.

This embodiment illustrates an example in which the lid 42 is fitted to an inner side of the open end 41*b* of the case main body 41. However, such an embodiment is merely illustrative. For example, as shown in JP 2015-60831 A, the lid may include a portion covering the open end of the case main body and a wall portion rising from the periphery of the covering portion. When this is the case, the lid is placed over the open end of the case main body so as to cover the open end of the case main body, and the outer side face of the open end of the case main body is brought into contact with the inner side face of the wall portion of the lid. Then, the outer side face of the open end of the case main body and the inner side face of the wall portion of the lid are laser welded to each other. In this case as well, friction between the case main body and the lid that are assembled to each other can be reduced by applying a lubricant to at least a portion of the contact location at which the case main body and the lid are in contact with each other and assembling the lid to the open end with the lubricant having been applied to the contact location. The lubricant may be a solvent used in a non-aqueous electrolyte solution for non-aqueous secondary batteries.

As has been described thus far, the method of manufacturing a non-aqueous secondary battery disclosed herein may be applied to a wide variety of non-aqueous secondary batteries in which a lid is fitted to an open end of a case main body. In the variety of non-aqueous secondary batteries in which a lid is fitted to an open end of a case main body, the method of manufacturing a non-aqueous secondary battery disclosed herein may be applied regardless of the shape of the open end of the case main body, the shape of the lid, and the assembling structure.

Various embodiments of the method of manufacturing a non-aqueous secondary battery have been described hereinabove according to the present disclosure. Unless specifically stated otherwise, the embodiments of the method of manufacturing a non-aqueous secondary battery described herein do not limit the scope of the present invention.

What is claimed is:

1. A method of manufacturing a non-aqueous secondary battery, comprising the steps of:

preparing a case main body, the case main body including an enclosing space for enclosing an electrode assembly and an open end for inserting the electrode assembly into the enclosing space;

preparing a lid to be fitted to the open end;

applying a lubricant to at least a portion of contact locations at which the case main body and the lid are in contact with each other; and assembling the lid to the open end with the lubricant having been applied to the contact locations, the assembled lid directly contacting and welded to the case body, wherein the lubricant is a solvent used in a non-aqueous electrolyte solution for non-aqueous secondary batteries, the lubricant does not include a material containing sulfur, in the step of applying a lubricant, the lubricant is applied to at least one of the case main body and the lid, the open end of the case main body includes a plurality of linear portions and a plurality of curved portions arranged along an edge of the open end, and each of the contact locations includes a plurality of linear portions and a plurality of curved portions arranged along the edge of the open end, and in the step of applying a lubricant, the lubricant is applied to at least the plurality of curved portions of the contact locations.

2. The method according to claim 1, wherein:

the open end of the case main body is in a substantially rectangular shape and includes a step along an inner side wall of the case main body;

the lid is a substantially rectangular-shaped plate material fitted to the open end; and in the step of applying a lubricant, the lubricant is applied to at least one of the corner portions of the substantially rectangular-shaped open end and corner portions of the lid.

3. The method according to claim 1, wherein the lubricant comprises at least one solvent selected from the group consisting of cyclic carbonate solvents, chain carbonate solvents, and ether solvents.

4. The method according to claim 1, wherein the lubricant comprises at least one solvent selected from the group consisting of ethyl methyl carbonate, ethylene carbonate, dimethyl ether, diethyl carbonate, propylene carbonate, and dimethyl carbonate.

5. The method according to claim 2, wherein the lubricant consists of at least one solvent selected from the group consisting of ethyl methyl carbonate, ethylene carbonate, dimethyl ether, diethyl carbonate, propylene carbonate, and dimethyl carbonate.

6. The method according to claim 1, wherein the lubricant consists of a solvent.

7. The method according to claim 1, wherein:

both of the case main body and the lid are made of aluminum material, and the lid is directly fitted to the open end of the case main body.

8. A method of manufacturing a non-aqueous secondary battery, comprising the steps of:

preparing a case main body, the case main body including an enclosing space for enclosing an electrode assembly and an open end for inserting the electrode assembly into the enclosing space;

preparing a lid to be fitted to the open end;

applying a lubricant to at least a portion of contact locations at which the case main body and the lid are in contact with each other, the assembled lid directly contacting and welded to the case body; and assembling the lid to the open end with the lubricant having been applied to the contact locations, wherein in the step of applying a lubricant, the lubricant is applied to at least one of the case main body and the lid, the lubricant consists of at least one selected from the group consisting of cyclic carbonate solvents, chain carbonate solvents, and ether solvents, and the lubricant does not include a material containing sulfur.

9. The method according to claim 8, wherein:

the open end of the case main body includes a plurality of linear portions and a plurality of curved portions arranged along an edge of the open end, and each of the contact locations includes a plurality of linear portions and a plurality of curved portions arranged along the edge of the open end; and in the step of applying a lubricant, the lubricant is applied to at least the plurality of curved portions of the contact locations.

10. The method according to claim 8, wherein:

the open end of the case main body is in a substantially rectangular shape and includes a step along an inner side wall of the case main body;

the lid is a substantially rectangular-shaped plate material fitted to the open end; and in the step of applying a lubricant, the lubricant is applied to at least one of the corner portions of the substantially rectangular-shaped open end and corner portions of the lid.

11. The method according to claim 8, wherein the lubricant consists of at least one selected from the group consisting of ethyl methyl carbonate, ethylene carbonate, dimethyl ether, diethyl carbonate, propylene carbonate, and dimethyl carbonate.

12. The method according to claim 8, wherein:

both of the case main body and the lid are made of aluminum material, and the lid is directly fitted to the open end of the case main body.

13. A method of manufacturing a non-aqueous secondary battery, comprising the steps of:

preparing a case main body, the case main body including an enclosing space for enclosing an electrode assembly and an open end for inserting the electrode assembly into the enclosing space;

preparing a lid to be fitted to the open end, including attaching the electrode assembly to the lid;

applying a lubricant to at least a portion of contact locations at which the case main body and the lid are in contact with each other; and assembling the lid to the open end with the lubricant having been applied to the contact locations, the assembled lid directly contacting and welded to the case body, wherein the lubricant is a solvent used in a non-aqueous electrolyte solution for non-aqueous secondary batteries, and the lubricant does not include a material containing sulfur.

14. The method according to claim 13, wherein:

the electrode assembly is a stacked electrode assembly, in which positive electrode sheets and negative electrode sheets are alternately stacked with separator sheets interposed therebetween.

15. The method according to claim 13, wherein:

the electrode assembly includes a positive electrode sheet, a first separator sheet, a negative electrode sheet, and a second separator sheet, each of which may be a long strip-shaped member.

16. The method according to claim 15, wherein:

the electrode assembly is a wound electrode assembly in which the positive electrode sheet and the negative electrode sheet are alternately stacked and wound with the first separator sheet and the second separator sheet interposed therebetween.

17. The method according to claim 13, wherein:

in the assembling the lid to the open end, the open end of the case main body is oriented downward and arranged above the electrode assembly that is attached to the lid.

18. The method according to claim 13, wherein:

in the step of applying a lubricant, the lubricant is applied to at least one of the case main body and the lid.

19. The method according to claim 13, wherein:

the open end of the case main body includes a plurality of linear portions and a plurality of curved portions arranged along an edge of the open end, and each of the contact locations includes a plurality of linear portions and a plurality of curved portions arranged along the edge of the open end, and in the step of applying a lubricant, the lubricant is applied to at least the plurality of curved portions of the contact locations.

20. The method according to claim 13, wherein:

the open end of the case main body is in a substantially rectangular shape and includes a step along an inner side wall of the case main body;

the lid is a substantially rectangular-shaped plate material fitted to the open end; and in the step of applying a lubricant, the lubricant is applied to at least one of the corner portions of the substantially rectangular-shaped open end and corner portions of the lid.

* * * * *